United States Patent [19]
Danzyger et al.

[11] Patent Number: 5,411,135
[45] Date of Patent: May 2, 1995

[54] CONTAINER AND ORGANIZER

[75] Inventors: Howard Danzyger, Bartlett; Michael Jaron, Mount Prospect, both of Ill.

[73] Assignee: Fellowes Manufacturing Company, Itasca, Ill.

[21] Appl. No.: 278,553

[22] Filed: Jul. 21, 1994

Related U.S. Application Data

[63] Continuation of Ser. No. 53,048, Apr. 26, 1993, abandoned.

[51] Int. Cl.⁶ .............................................. B65D 5/50
[52] U.S. Cl. .................................. 206/45.15; 206/45; 206/308.3; 220/4.03
[58] Field of Search ...................... 206/45, 45.15, 425, 206/444; 220/4.03, 8, 345, 346, 551; 211/40, 41, 55; 312/9.53, 9.54, 9.55, 9.56

[56] References Cited

U.S. PATENT DOCUMENTS

| | | | |
|---|---|---|---|
| 188,519 | 3/1877 | Lamoree | 211/55 |
| 386,964 | 7/1888 | Cochran | 211/55 |
| 490,156 | 1/1893 | Miller | 206/45 |
| 684,761 | 8/1907 | Erickson | 211/55 |
| 792,427 | 6/1905 | Knudsen | 211/55 |
| 1,809,355 | 6/1931 | Powell | 220/8 |
| 4,083,456 | 4/1978 | Genn et al. | 211/55 |
| 4,387,802 | 6/1983 | Shearing et al. | 206/45 |
| 4,444,314 | 4/1984 | Jacobsson | 206/45 |
| 4,589,544 | 5/1986 | Schweinsberg | 206/425 |
| 4,871,066 | 10/1989 | LaWall | 206/444 |
| 4,871,218 | 10/1989 | Swinson | 206/425 |

FOREIGN PATENT DOCUMENTS

WO89/11719 11/1989 WIPO.

OTHER PUBLICATIONS

A copy of a shipping carton for Elastic Disk File (1993) together with pictures and a copy of the pictures showing the front and rear of a holder for Disk File.

A copy of a shipping carton for Step Cube ™ Diskette File (1988) together with pictures and a copy of the pictures showing the front and rear of a holder for the Diskette File.

*Primary Examiner*—David T. Fidei
*Attorney, Agent, or Firm*—Willian Brinks Hofer Gilson & Lione

[57] ABSTRACT

A container and organizer particularly for computer diskettes. The container includes a housing that can receive a plurality of holders which can be moved from an aligned position to an offset position. The holders have at least one horizontal retaining ridge to retain an adjacent holder in the offset position.

32 Claims, 4 Drawing Sheets

CONTAINER AND ORGANIZER

This application is a continuation of application Ser. No. 08/053,048, filed Apr. 26, 1993, now abandoned.

BACKGROUND OF THE INVENTION

The present invention relates to a container and organizer for computer diskettes. More particularly, the present invention relates to a container for storing and organizing computer diskettes such that the diskettes may be safely stored and may also be easily displayed.

Containers are available for storing and organizing computer diskettes. Nevertheless, one problem with existing containers is that they consume valuable working space. Another problem is that they do not adequately protect the diskettes if, for example, the container is dropped or overturned. Yet another problem with available containers is that the cover, if provided, either is hinged to the container and when opened consumes even more valuable work space, or is removable, in which case the user must find a place to temporarily store the cover without losing it. Yet another problem with existing containers is that it is difficult to view the diskettes when the diskettes are stored, particularly the label portion.

The container of the present invention solves each of these problems by providing a compact diskette storage container having individual holders for each individual diskette so that they may be organized and stored. The holders may be in an aligned position suitable for storage or moved to an offset position so that the contents of each holder may be easily viewed, particularly the label portion of the diskette. A cover is provided to protect and secure the diskettes even if the container is overturned. Moreover, the cover can conveniently be stored on the container so that valuable work space is not wasted.

SUMMARY OF THE INVENTION

The present invention comprises a container including a housing with a plurality of holders. The holders comprise a front and a rear with the rear having at least one protruding ridge. The front of each holder is slidably engaged to the rear of an adjacent holder such that when one holder is offset with respect to an adjacent holder, the one holder will be substantially retained in the offset position by the ridge on the rear of the adjacent holder. In this way, objects placed within a holder may be viewed. The one holder may also be returned to an aligned position with respect to an adjacent holder so that when all the holders are in an aligned position, the contents of the holders may be stored.

The container may also include a cover that is slidably engaged to the housing to cover the holders so that the contents are not dislodged when, for example, the container is overturned. The housing preferably has grooves to slidably receive the cover in a storage position when the cover is removed from the cover position.

In a preferred embodiment of the invention, a container is provided suitable for containing computer diskettes. The container includes a housing and a plurality of holders suitable for storing 3½ inch diskettes. In this preferred embodiment, the holders comprise a front to receive the diskette and a rear having a protruding ridge. A first holder is secured to the housing with successive holders slidably engaged to each other. In particular, the front of each of the successive holders are slidably engaged to the rear of an adjacent holder such that when one holder is moved to a position offset from an adjacent holder, the one holder will be movably retained in place by at least one horizontal retaining ridge provided on the rear of the adjacent holder. The holders may also be moved to an aligned position so that the diskettes can be stored. A cover may be provided to retain the diskettes within their respective holders even if the container is overturned.

In a more preferred embodiment, a container is provided for storing 3½ inch computer diskettes. The container includes a housing and a plurality of holders suitable for containing 3½ inch diskettes. The housing comprises at least a front wall and a bottom wall substantially normal to the from wall. Two parallel side walls, each substantially normal to both the front wall and the bottom wall, may be provided. A first holder is secured to the housing, preferably to the front wall. Successive holders are slidably engaged to each other with the front of one holder being slidably engaged to the rear of an adjacent holder. The holders comprise a front, a rear with at least one horizontal retaining ridge, a bottom wall extending substantially to receive a diskette normal the front, and two parallel side walls extending substantially normal to the front. The rear of each holder also has at least one hook that slidably engages the side wall of an adjacent holder so that the holders can be moved to and from an offset position with respect to an adjacent holder. When the front of one holder is offset with respect to an adjacent holder, the bottom wall substantially abuts the top surface of the ridge to retain the one holder in an offset position.

In this more preferred embodiment, a cover may be provided to be slidably received by the housing to cover the holders so that the contents of the holders are not dislodged when, for example, the container is overturned. The cover may also be received by the housing in a storage position (not coveting the holders) so that the cover can be conveniently stored when the user seeks access to the contents of the holders.

Although it is particularly desirable to store computer diskettes commonly known as 3½ inch diskettes in the containers of the present invention, it is to be understood that any object may be stored in the container of the present invention. For ease of description, however, and without being limited, the container will be described by reference to 3½ inch diskettes.

DETAILED DESCRIPTION OF THE INVENTION AND PREFERRED EMBODIMENTS

According to the present invention, a container 10 is provided comprising a housing 12, an optional cover 40, and a plurality of holders 60. The holders 60 are received in the housing 12 and are capable of containing objects. The holders 60 are slidably engaged with each other and can be moved from an aligned position to an offset position with respect to an adjacent holder and retained in the offset position so that the contents of each holder may be viewed. Most preferably, the container, including the housing, the cover, and the holders are molded of plastic with the housing and the holders preferably being molded from polystyrene.

Figure 1:
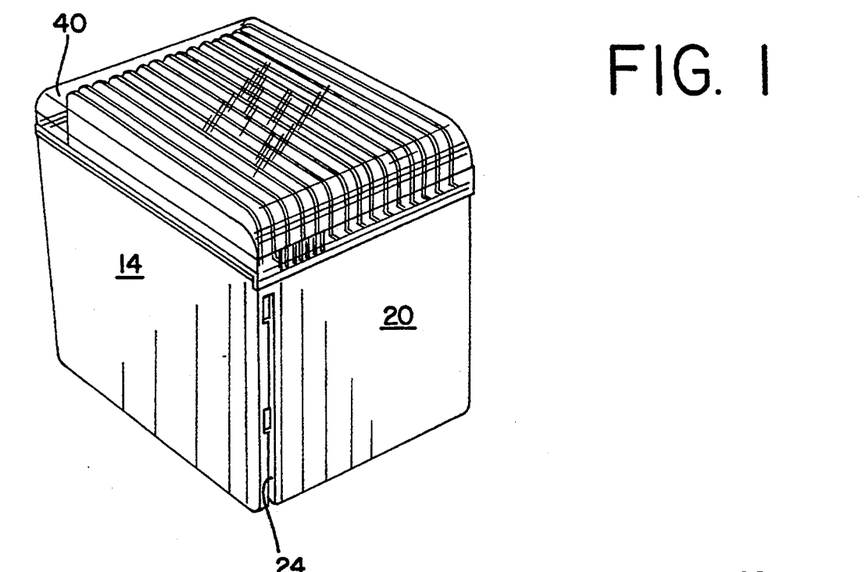
FIG. 1 is a front perspective view of the most preferred embodiment of the container of the present invention shown with the cover in a cover position.

FIG. 1 shows the most preferred embodiment of the container 10 of the present invention where the housing 12 comprises a front wall 14 and a bottom wall 16 substantially normal to the front wall 14. A first side wall 18 is provided substantially normal to the front wall 14 and the bottom wall 16. A second side wall 20 is provided parallel to the first side wall 18 and substantially normal to the front wall 14 and the bottom wall 16.

Figure 2:
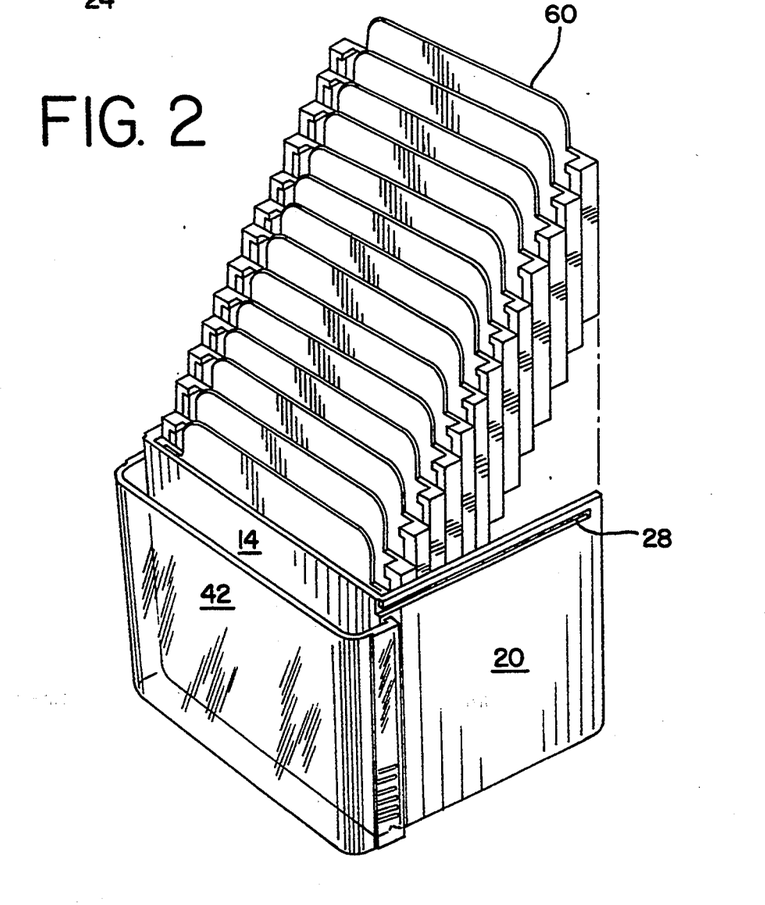
FIG. 2 is a front perspective view of the computer diskette container of FIG. 1 in a vertical position with individual holders extended vertically upward and offset with respect to an adjacent holder so that the contents of the holders can be displayed. The cover is removed from a cover position and is in a stored position.

Side wall 20 is provided with a horizontal groove 28 as best seen in FIG. 2. Preferably, the groove 28 is open at the front and extends rearward substantially the length of the side wall 20. Likewise, side wall 18 is also provided with a horizontal groove 26. Preferably, the groove 26 is open at the front and extends rearward substantially the length of the side wall 18. The grooves 26 and 28 slidably receive an optional cover 40. Alternatively, the grooves 26 and 28 may be open at the rear and extend forward substantially the length of the side walls.

It will also be seen from FIG. 1 that side wall 20 has a vertical groove 24. Preferably, the groove 24 is open at the bottom and extends upward substantially the height of the side wall 20. Similarly, side wall 18 also has a vertical groove 22 preferably open at the bottom and extending upward substantially the height of the side wall 18. Alternatively, the grooves 22 and 24 may be open at the top and extend downward substantially the length of the side walls.

FIG. 1 shows the optional cover 40 in a cover position, i.e., a position covering the holders 60. The cover 40 cooperates with the housing 12 to locate the cover 40 above the holders 60. Preferably, the cover 40 is a clear or transparent plastic and comprises a top 42, a first side 44 and a second side 46, each extending downward from the top 42. A front wall 48 extending downward from the top is desirably provided. The sides 44 and 46 cooperate with the horizontal grooves 26 and 28 so that the cover is located above the holders 60 to protect the contents of the holders. More preferably, the sides 44 and 46 have ribs 50 extending inwardly to slidably engage the horizontal grooves 26 and 28.

The cover 40 may be moved from a cover position to a storage position, best seen in FIG. 2. More particularly, the cover 40 cooperates with the housing 12 so that the cover can be removably engaged to the housing 12 adjacent the front wall 14. When the cover 40 is removed from its cover position it can be stored on the housing 12 by sliding the cover 40 into the corresponding grooves 22 and 24. In this way the cover 40 can be removed and stored in a convenient location so that it will not be lost. In addition, it can be appreciated from FIG. 2, that when the cover 40 is in a stored position, an object can be temporarily stored in the area between the cover 40 and the front wall 14 of the housing 12.

In an alternative embodiment, the housing 12 comprises a front wall 14 and a bottom wall 16 substantially normal to the front wall 14. In another embodiment, the housing comprises a front wall 14, a first side wall 18 substantially normal to the front wall 14 and a second side wall 20 parallel to the first side wall 18 and substantially normal to the front wall 14.

FIG. 2 shows the container 10 of the most preferred embodiment in a vertical orientation where the front wall 14 of the housing 12 is in a substantially vertical position and the bottom wall 16 is adjacent the surface upon which the container 10 is placed. When the container 10 is in this "vertical" position, the holders 60 can be offset with respect to each other in a vertical direction so that the contents can be easily viewed.

Figure 3:
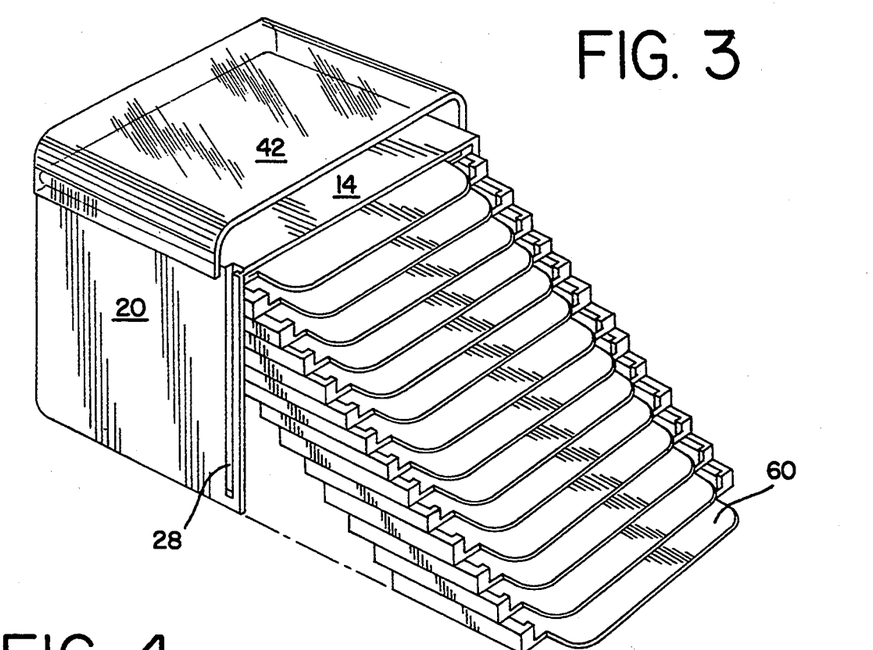
FIG. 3 is a front perspective view of the computer diskette container of FIG. 1 in a horizontal position with individual holders extended horizontally outward and offset with respect to an adjacent holder so that the contents of the holder can be displayed. The cover is removed from a cover position and is in a stored position.

It is another feature of the present invention that the container may be placed in a "horizontal" position. FIG. 3 shows the container of FIG. 2 in a horizontal position with the front wall 14 of the housing 12 in a horizontal orientation with the bottom wall 16 substantially normal to the surface upon which the container 10 is placed. In this position, the holders 60 can be offset with respect to each other in a horizontal direction so that the contents can be easily viewed. Generally, the description of the present invention will made with the container in the so-called vertical direction although it will be recognized by one skilled in the art that the container of the present invention may be used in the described horizontal position.

Figure 4:
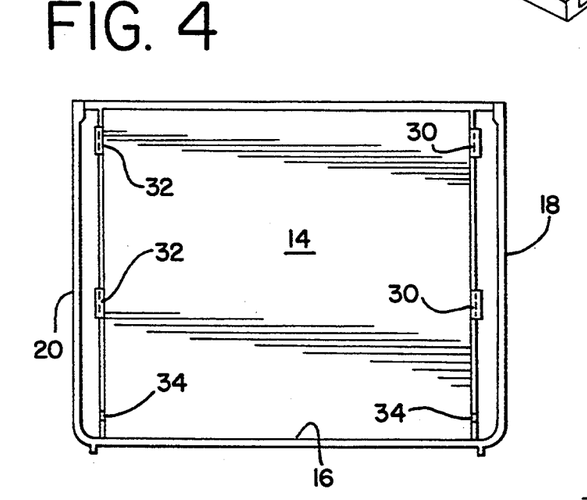
FIG. 4 is a perspective view of the rear of the housing of FIG. 1 with the holders removed.

FIG. 4 shows the rear of the housing 12 of FIG. 1 with all the holders 60 removed. Two hooks 30 are provided on and normal to the front wall 14 near the side wall 18. Two hooks 32 are also provided on and normal to the front wall 14 near the side wall 20. The hooks 30 and 32 slidably engage the front 62 of the holder 60 located adjacent the front wall 14 as will become more evident below. Of course, more than two hooks 30 and 32 could be provided and any number may be provided.

Alternatively, only one hook need be provided on the front wall 14 to slidably engage the front 62 of the holder 60 adjacent the front wall 14. The hook may be provided in any of the locations shown by hooks 30 and 32 in FIG. 4 or in any other suitable location to slidably engage the front 62 of the holder 60. Also, two hooks could be provided, with one hook provided near the first side wall 18 and the other hook provided near the second side wall 20.

In another embodiment, at least one hook may be provided and may be located either on side wall 18 or on side wall 20. Preferably, in this embodiment two hooks would be provided with one hook on one side wall 18 and the other hook on the other side wall 20. Of course, two hooks could be located on side wall 18 and two hooks could be located on side wall 20. Of course, any number of hooks could be provided.

It is to be understood, however, that any structure that will slidably engage the front 62 of the holder 60 located adjacent the front wall 14 can be provided. For example, instead of discrete hooks, a continuous rail may be provided on the front wall to engage the front of the holder adjacent to the front wall. Where a rail is provided, it may extend from the bottom 16 upward a substantial portion of the height of the front wall 14. Preferably, two rails will be provided on and normal to the front wall 14 and near each side wall 18 and 20.

Preferably, a stop 34 is provided on and normal to the front wall 14 near the bottom 16 and near the side wall 18. Another stop 34 may be provided on and normal to the front wall 14 near the bottom and near the side wall 20. Alternatively, only one stop may be provided on the front wall 14 near the bottom 16. The stops 34 limit the amount of offset movement that the holder 60 adjacent the front wall 14 can attain as will become more evident below. Accordingly, any number of stops can be provided.

In another embodiment, at least one stop is provided on the side wall 18 near the bottom 16. In this embodiment, another stop may be provided on the other side wall 20 or only one stop may be provided and located on the side wall 20 near the bottom 16. Of course, any number of stops may be provided on the side walls 18 and 20. In yet another embodiment, no stops are provided on either the front wall 14 or on the side walls 18 and 20.

Figure 12:
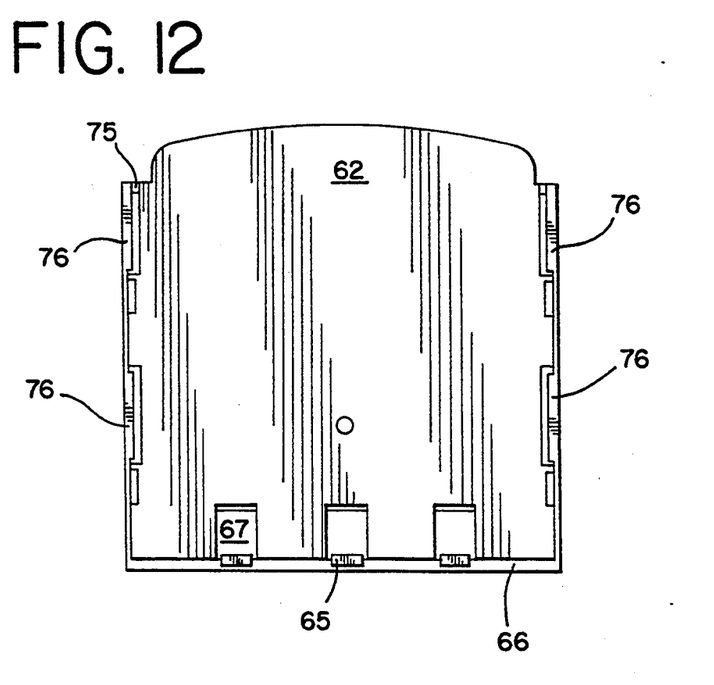
FIG. 12 is a plan view of the front of an alternative holder.
Figure 13:
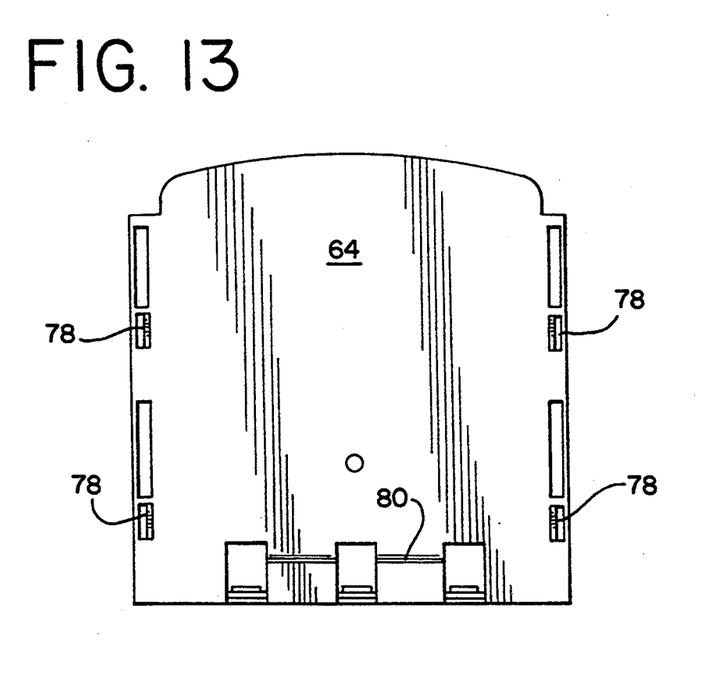
FIG. 13 is a plan view of the rear of the holder of FIG. 12.

Alternatively, feet may be provided on the bottom of the front 62 of the holder as best seen in FIG. 12. The front of the housing in this embodiment will have apertures or slots to receive the feet that are provided on the holder adjacent the front of the housing. In this way, the amount of offset movement of the holder 60 will be limited.

Figure 5:
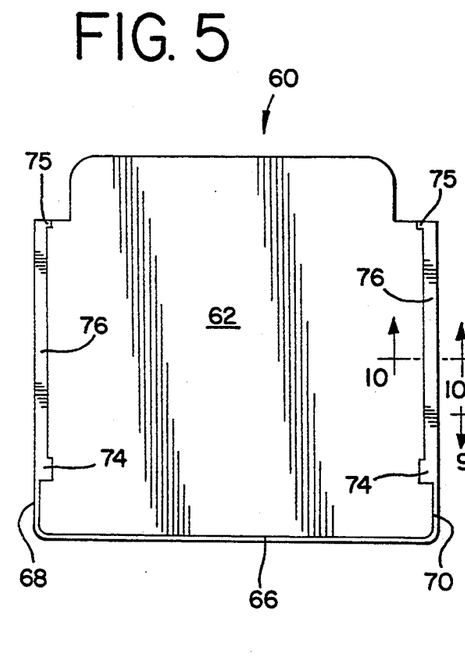
FIG. 5 is a plan view of the front of a holder useful in the container of FIG. 1.
Figure 6:
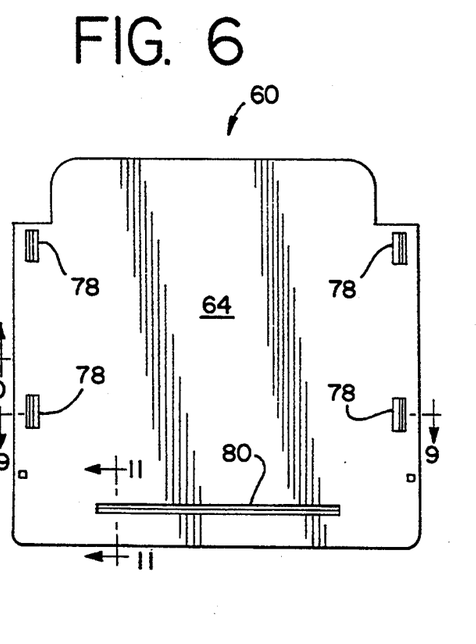
FIG. 6 is a plan view of the rear of a holder useful in the container of FIG. 1.
Figure 7:
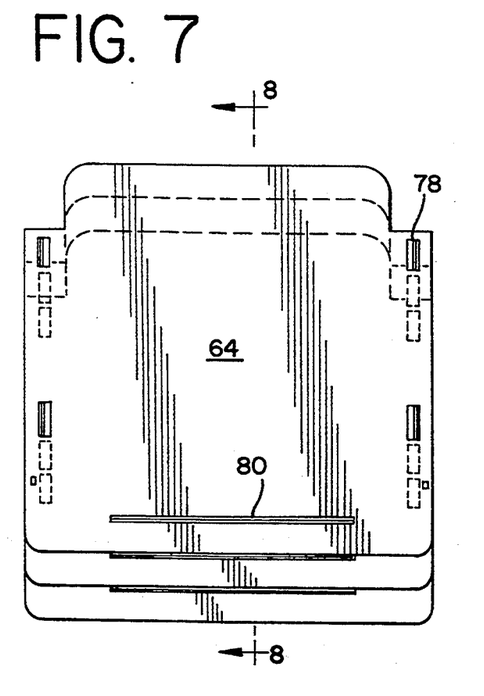
FIG. 7 is a plan view of the rear of several holders useful in the container of FIG. 1 with each holder being offset with respect to the adjacent holder and with the retaining ridge provided on the rear of the adjacent holder retaining the one holder in an offset position.
Figure 8:
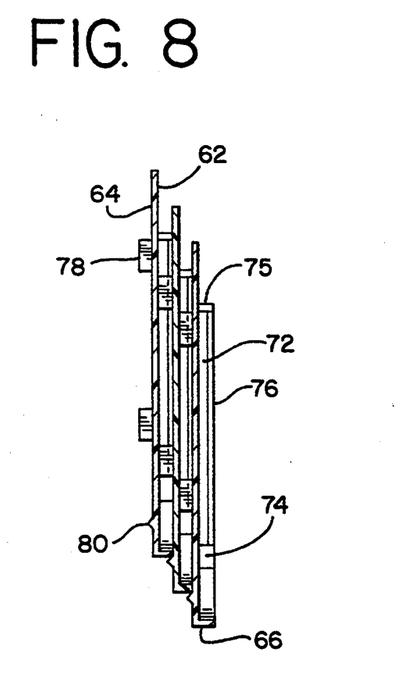
FIG. 8 is a cross-sectional view of the several holders of FIG. 7 along line 8—8.

FIGS. 5 and 6 show a plan view of the most preferred embodiment of a holder 60 from the front and the rear, respectively. FIGS. 7 and 8 show the most preferred embodiment of several holders 60 slidably engaged and offset with respect to adjacent holders. Referring now to FIGS. 5 and 6, the holder 60 has a front 62 and rear 64. The front 62 further has a bottom 66 normal to the front 62. Preferably, the bottom 66 extends normal to the front 62 about 5 millimeters (mm). The front 62 also has parallel side walls 68 and 70 normal to the front 62 and bottom 66. Preferably, the walls 68 and 70 extend normal to the front 62 about 5 mm. The side walls 68 and 70 preferably are coextensive with the bottom 66. By providing a bottom 66 and side walls 68 and 70 extending from the front, an object can be suitably stored when the front 62 of one holder is slidably engaged with the rear 64 of the adjacent holder 60. More particularly, a computer diskette commonly known as a 3½ inch diskette can be stored in each holder.

As best seen in FIGS. 5 and 6, the holders 60 most preferably have a main body portion, defined by the height of the side walls 68 and 70, and a top portion. Generally, the top portion has a lateral length less than the length between the side walls 68 and 70. It will be understood that when the holders 60 are in an aligned position, as best seen in FIG. 1, the main body portion has a height substantially the same as the height of the side walls 18 and 20 of the housing 12. It will also be appreciated that, when the holders are manufactured to contain 3½ inch diskettes, the height of the holder 60, including the main body portion and the top portion, will be substantially the same as the height of a inch diskette.

Figure 9:
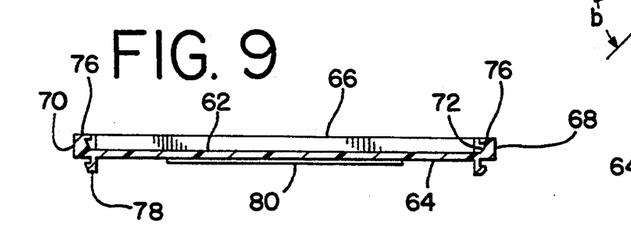
FIG. 9 is a cross sectional view of the holder of FIG. 5 along line 9—9.
Figure 10:
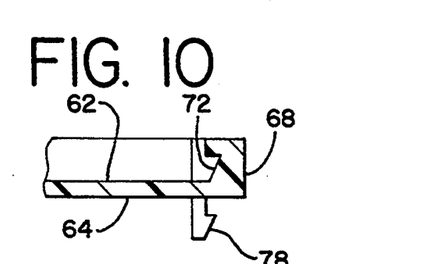
FIG. 10 is an expanded cross-sectional view of a potion of the holder of FIG. 5 along line 10—10 showing the detail of the hook and the channel.

The rear 64 of the holder is provided with four hooks 78 extending outward at a substantially fight angle to the rear 64. As best seen in FIGS. 9 and 10, the operative portion of the hook 78 extends toward its respective side wall 68 or 70. The hooks 78 of the most preferred embodiment are spaced apart and are located near the side walls 68 and 70 and near the top and the bottom of the holder.

Alternatively, only two hooks 78 may be provided. In this case, a single hook 78 would be provided near each side wall 68 and 70. In another embodiment, only a single hook 78 may be provided and could be located near either of the side walls 68 or 70. Of course, it is to be understood that structures other than hooks may be provided on the rear 64 to slidably engage the front of the adjacent holder. For example, instead of discrete hooks a pair of rails, each located near the side walls may be provided on the rear 64 to slidably engage the front of an adjacent holder.

The hooks slidably engage the front of the adjacent holder so that the holders can be moved from an aligned position to an offset position. More preferably, the hooks slidably engage the side walls 68 and 70 on the front 12 of an adjacent holder. In accordance with the most preferred embodiment, the hooks slidably engage channels 72 provided on the side walls 68 and 70, as will be more fully described below.

The rear 64 of the holder 60 is also provided with at least one horizontal retaining ridge 80 located near the bottom 66. The retaining ridge 80 extends a substantial portion toward each side wall 68 and 70. Of course, several discrete horizontal retaining ridges, each lying on the same plane, could be provided. Where more than one ridge is provided, they can be located, for example, near each side wall. It is to be understood that the number and length of each ridge may depend on, for example, the width of the holder. Preferably, the retaining ridge, where only one is provided, has a sufficient length to retain the adjacent holder in an offset position.

Figure 11:
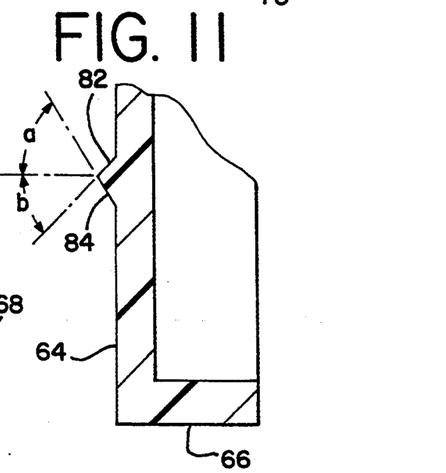
FIG. 11 is a partial expanded cross-sectional view of the retaining ridge provided on the rear of the holders.

As better seen in FIG. 11, the retaining ridge 80 has a substantially triangular shape with a base coextensive with the rear 64 and has a sloped top surface 82 and a sloped bottom surface 84. By providing a ridge having a triangular shape the front of the adjacent holder will be able to slide over one slope of the ridge and at the same time when the adjacent holder is in an offset position, it will be substantially retained in place by the other slope of the ridge. Of course, the height of the ridge should not be so excessive that the adjacent holder cannot slide over the ridge. At the same time, the height of the ridge must be sufficient to retain the adjacent holder in the offset position.

Advantageously, the top surface 82 is angled closer to the horizontal than the bottom surface 84. Preferably, the bottom surface is angled (a) from the horizontal at about 55 degrees and the top surface is angled (b) from the horizontal at about 45 degrees. It will be understood by one skilled in the art, that the top surface of the retaining ridge should be angled more to the horizontal than the bottom surface so that, on the one hand, the adjacent holder will be retained in the offset position by the top surface and on the other hand, the adjacent holder can slide over the bottom surface from an aligned position to an offset position. The difference in the angle between the top 82 and the bottom 84 allows the holder 60 adjacent to the ridge 80 to be easily moved into an offset position and once in the offset position, retained in the offset position due to the angle (a) of the top surface 82 of the ridge as shown in FIGS. 7 and 8.

As noted above, the side walls 68 and 70 are preferably provided with channels 72, best seen in FIGS. 9 and 10. The channels 72 are slidably engaged by the rear 64 of the adjacent holder 60 preferably by the hooks 78 provided on the rear 64 of the adjacent holder 60. Most preferably, the channels 72 have an inclined surface to positively mate with the hooks 78 provided on the rear 64 of the adjacent holder 60. In this most preferred embodiment, the channel 72 is provided with at least one stop. Preferably, each channel 72 is provided with two stops; a lower stop 74 and an upper stop 75°. The lower stop 74 is advantageously located so that when one holder 60 is moved to an offset position with respect to an adjacent holder, the hooks 78 on the rear 64 of the adjacent holder slide in the channel 72 of the one holder until the hooks 78 contact the lower stop 74 and the one holder can not be moved any further. At the same time, the bottom wall 66 of the one holder 60 slides over the bottom surface 84 of the ridge 80 on the rear 64 of the adjacent holder 60 to a position substantially abutting the top surface 82 of the retaining ridge 80 so that the one holder is retained in an offset position until the user moves the one holder to the aligned position.

Upon movement of the one holder 60 to the aligned position, the hooks 78 slide in channel 72 until the hooks contact the upper stop 75 at which point, the one holder will be in an aligned position with respect to the adjacent holder. At the same time, the bottom 66 of the one holder will slide over the top surface 82 of the ridge 80. It will be appreciated by one skilled in the art that the amount of force required to move the holders to an aligned position will be greater than the amount of force required to move the holders to an offset position because of the difference in the slope between the top surface 82 of the ridge and the bottom surface 84 of the ridge.

The channels 72 are preferably provided with a top wall 76 so that the hook 78 will be more securely engaged within the channels 72.

Alternatively and as best seen in FIG. 12, the channel may be provided only on the portion of the side wall which receives the hook from the adjacent holder. In this embodiment, a lower stop need not be provided. In addition, it may be desirable to provide feet 65 extending outward and upward from the bottom 66 to engage slots 67 provided on the adjacent holder. The slots 67 extend substantially from the bottom of the holder upward a distance desirable to provide an offset to an adjacent holder. In this way, when one holder is moved to an offset position with respect to an adjacent holder, the feet 65 will contact the upper portion of the slot 67 so that the adjacent holder will be urged to an offset position with respect to an adjacent holder. This urging movement preferably begins with the rearmost holder and continues until all the holders, except the holder adjacent the front of the housing, have been moved to an offset position. When the front of one holder is in an offset position with respect to the rear of adjacent holder, the one holder will be substantially retained in the offset position by the retaining ridge 80 on the rear of the adjacent holder.

The holder 60 closest to or adjacent the front wall 14 of the housing 12 will be secured to the housing 12 so that when the successive holders 60 are moved out of an aligned position to an offset position the plurality of holders will be retained by the housing. Preferably, the front 62 of the holder 60 adjacent the front wall 14 of the housing is slidably engaged by the hooks 30 and 32 provided on the front wall 14. In this embodiment, the holder 60 adjacent the front wall will be free to move to an offset position with respect to the front wall 14.

In accordance with the most preferred embodiment, the holder 60 adjacent the front wall 14 is secured from offset movement by the stops 34 which will contact the bottom 66 of the holder when it is attempted to move the holder. It will be understood that because, in the most preferred embodiment, the holder 60 has an overall height greater than the height of the front wall 14, it is not necessary that the holder 60 adjacent the front wall 14 be moved to an offset position to view the contents, for example, the label portion the diskette.

Of course, other methods of securing the holder adjacent the front wall from movement are contemplated. For example, the holder adjacent the front wall could be molded with the housing or adhered to the housing by glue, cement, epoxy, or other like fasteners.

Where the housing comprises a front wall and two side walls, the holder adjacent the front wall could be secured by stops provided on the front wall or on the side walls. Alternatively, the holder could be secured to either the front wall of the side walls.

Desirably, a rear or last holder is provided and is characterized by the absence of a holder adjacent its rear. In addition, the last holder preferably does not have hooks 78 or a retaining ridge 80. Instead, a plurality of spaced apart grasping ridges may be provided on its rear near the bottom to provide a surface to aid the user in moving the rear holder, and successively the other holders 60, to an offset position. Other spaced apart grasping ridges may also be provided on the rear 64, for example, near the top of the holder 60.

To use the container of the most preferred embodiment, the user will place the container on a work surface, generally in the vertical position. The cover 40 will be slidably removed from the housing and then slidably engaged on the housing 12 in a storage position, best seen in FIG. 2. When the cover 40 is removed, the individual holders are exposed and are in an aligned position. In the aligned position, the label portion of the diskette stored in the holder adjacent the front wall 14 of the housing is visible. The label portions of the diskettes stored in the other holders, however, are not visible. Consequently, the user will grasp the rear of the last holder, preferably in the area where the spaced apart grasping ridges are provided, and urge the last holder in an upward direction. The upward movement of the last holder will continue until the hooks in the rear 64 of the adjacent holder contact the lower stop 74 provided in the channel 72 on the front 62 of the last holder and until the bottom 66 of the last holder slides over the adjacent retaining ridge 80 at which time the successive holders are urged into an upward movement until the holder adjacent the holder that is adjacent the front wall 14 is in an offset position with respect to the holder adjacent the front wall 14. Each of the holders 60 will then be in an offset position with respect to an adjacent holder so that the contents of the holders can be viewed. When the holders are in an offset position, the housing can be moved from a vertical position to a horizontal position, best seen in FIG. 3. Of course, not all of the holders need be in an aligned position or in an offset position at the same time.

To move the holders from an offset position to an aligned position, the top portions of the holders are urged downward (when the housing is in a vertical position) until the hooks engage the upper stop 75 in the adjacent holder so that each of the holders assume an aligned position with respect to the other holders.

Of course it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A container comprising a housing containing a plurality of adjacent holders, each holder comprising a front, a rear, a top and a bottom, wherein the front of at least some of the holders are slidably engaged to the rear of an adjacent holder, with the rear of at least some of the holders having at least one horizontal retaining ridge located between and spaced from the top and bottom such that when the front of one holder is offset with respect to the rear of the adjacent holder having a retaining ridge, the retaining ridge on the adjacent holder substantially abuts the front of one holder and retains the one holder in the offset position.

2. The container of claim 1 wherein the housing comprises a front wall substantially normal to a bottom wall.

3. The container of claim 2 wherein the housing further comprises two substantially parallel side walls joined to the front and bottom wall.

4. The container of claim 3 wherein the holder located adjacent the front wall of the housing is secured to the housing.

5. The container of claim 3 wherein the front wall of the housing has at least one hook to slidably engage the front of a holder.

6. The container of claim 5 wherein the front wall of the housing has a hook near the first side wall and a hook near the second side wall, the hooks slidably engaging the front of an adjacent holder.

7. The container of claim 1 wherein each holder further has two parallel side walls extending substantially normal to the front such that the side walls are slidably engaged to the rear of an adjacent holder.

8. The container of claim 7 wherein the rear of at least some of the holders further include at least one hook to slidably engage a side wall on the front of an adjacent holder.

9. The container of claim 8 wherein at least a portion of each of the side walls have a channel to slidably receive the hook.

10. The container of claim 9 wherein the channel has a stop to limit the distance one holder can be offset with respect to an adjacent holder.

11. The container of claim 1 wherein the rear of at least some of the holders further include at least one hook to slidably engage the front of an adjacent holder.

12. The container of claim 1 wherein the rear of at least some of the holders further include a hook near the first side wall and a hook near the second side wall, the hooks slidably engaging the front of an adjacent holder.

13. The container of claim 1 wherein the holders further have a bottom wall extending substantially normal to the front, so that when the front of one holder is offset with respect to the rear of an adjacent holder, the bottom of the one holder substantially abuts the ridge of the adjacent holder to retain the one holder in place.

14. The container of claim 1 wherein the ridge is substantially triangular.

15. The container of claim 14 wherein one side of the ridge has a steeper incline than the other side of the ridge.

16. A container comprising:
 a. a housing comprising two parallel side walls joined by a front wall; and,
 b. a plurality of adjacent holders contained within the housing, each holder comprising a front, a rear, a top and a bottom, wherein the front of at least some of the holders are slidably engaged to the rear of an adjacent holder, with the rear of at least some of the holders having at least one horizontal retaining ridge located between and spaced from the top and bottom such that when the front of one holder is offset with respect to the rear of the adjacent holder having a retaining ridge, the retaining ridge on the adjacent holder substantially abuts the front of the one holder and retains the one holder in the offset position.

17. A container comprising:
 a. a housing comprising a front wall substantially normal to a bottom wall, two substantially parallel side walls joined to the front and bottom wall, the front wall further having at least one hook;
 b. a first holder adjacent the front wall, the holder having a front and a rear with the front slidably engaged with the hook on the front wall of the housing; and,
 c. a plurality of holders, each holder comprising a front, a rear, a top and a bottom, the rear of at least some of the holders having at least one horizontal retaining ridge located between and spaced from the top and bottom, wherein the front of at least some holders are slidably engaged to the rear of an adjacent holder such that when the front of one holder is offset with respect to the rear of the adjacent holder having a retaining ridge, the retaining ridge on the adjacent holder substantially abuts the front of the one holder and retains the one holder in the offset position.

18. The container of claim 17 wherein the holders further have two parallel side walls extending substantially normal to the front.

19. The container of claim 18 wherein at least a portion of each of the side walls have a channel to slidably engage the rear of an adjacent holder.

20. The container of claim 19 wherein the channel has a stop to limit the distance one holder can be offset with respect to an adjacent holder.

21. The container of claim 17 wherein the rear of the first holder and the rear of at least some of the plurality of holders further include at least one hook to slidably engage the front of an adjacent holder.

22. The container of claim 17 wherein the rear of at least some of the holders further include a hook near the first side wall and a hook near the second side wall, the hooks slidably engaging the front of an adjacent holder.

23. The container of claim 18 wherein the front of each plurality of holders further has a bottom wall extending at a substantially right angle from the front, so that when the front of one holder is offset with respect to the rear of an adjacent holder, the bottom of the one holder substantially abuts the ridge of the adjacent holder to retain the one holder in place.

24. The container of claim 17 wherein the ridge is substantially triangular.

25. The container of claim 24 wherein one side of the ridge has a steeper incline than the other side of the ridge.

26. A container comprising a housing containing a plurality of adjacent holders, each holder comprising
   a. a front;
   b. a rear, the rear of at least some of the holders having at least one hook and at least one horizontal retaining ridge such that when the front of one holder is offset with respect to the rear of an adjacent holder having a retaining ridge, the retaining ridge substantially retains the one holder in the offset position; and,
   c. two parallel side walls extending substantially normal to the front with at least a portion of each of the side walls having a channel to slidably receive the hook and to slidably engage rear of an adjacent holder having a hook, the channel further having a stop to limit the distance one holder can be offset with respect to an adjacent holder.

27. A container comprising a housing containing a plurality of adjacent holders, each holder comprising a front and a rear, the rear of at least some holders having at least one horizontal substantially triangular retaining ridge, wherein the front of one holder is slidably engaged to the rear of an adjacent holder and one side of the ridge has a steeper incline than the other side of the ridge such that when the front of one holder is offset with respect to the rear of the adjacent holder having a retaining ridge, the one holder will be substantially retained in place by the retaining ridge.

28. A container comprising:
   a. a housing comprising a from wall substantially normal to a bottom wall, two substantially parallel side walls joined to the front and bottom wall, the front wall further having at least one hook;
   b. a first holder adjacent the front wall, the holder having a front and a rear with the front slidably engaged with the hook on the front wall of the housing; and,
   c. a plurality of holders, each holder comprising a front and a rear, the rear of at least some of the holders having at least one horizontal substantially triangular retaining ridge wherein one side of the ridge has a steeper incline than the other side and wherein the front of at least some holders are slidably engaged to the rear of an adjacent holder such that when the front of one holder is offset with respect to the rear of the adjacent holder having a retaining ridge, the one holder will be substantially retained in place by the ridge.

29. A container comprising a housing containing a plurality of adjacent holders, each holder comprising a front and a rear with a bottom wall extending substantially normal to the front, wherein the front of at least some of the holders are slidably engaged to the rear of an adjacent holder, with the rear of at least some of the holders having at least one horizontal retaining ridge such that when the front of one holder is offset with respect to the rear of the adjacent holder having a retaining ridge, the bottom of the one holder substantially abuts the ridge of the adjacent holder to retain the one holder in the offset position.

30. A container comprising:
   a. a housing comprising a front wall substantially normal to a bottom wall, two substantially parallel side wails joined to the front and bottom wall, the front wall further having at least one hook;
   b. a first holder adjacent the front wall, the holder having a front and a rear with the front slidably engaged with the hook on the front wall of the housing; and,
   c. a plurality of holders, each holder comprising a front, a rear, and two parallel side walls extending substantially normal to the front, the rear of at least some of the holders having at least one horizontal retaining ridge, wherein at least a portion of each of the side walls have a channel to slidably engage the rear of an adjacent holder so that at least some holders are slidably engaged to the rear of an adjacent holder, such that when the front of one holder is offset with respect to the rear of the adjacent holder having a retaining ridge, the one holder will be substantially retained in place by the retaining ridge.

31. The container of claim 30 wherein the channel has a stop to limit the distance one holder can be offset with respect to an adjacent holder.

32. A container comprising:
   a. a housing comprising a front wall substantially normal to a bottom wall, two substantially parallel side walls joined to the front and bottom wall, the front wall further having at least one hook;
   b. a first holder adjacent the front wall, the holder having a front and a rear with the front slidably engaged with the hook on the front wall of the housing; and,
   c. a plurality of holders, each holder comprising a front, a rear, two parallel side walls extending substantially normal to the front, and a bottom wall extending substantially normal to the front and the two side walls, the rear of at least some of the holders having at least one horizontal retaining ridge, wherein the front of one holder is slidably engaged to the rear of an adjacent holder and when the front of one holder is offset with respect to the rear of the adjacent holder having a retaining ridge, the bottom of the one holder substantially abuts the ridge of the adjacent holder to retain the one holder in place.

* * * * *

UNITED STATES PATENT AND TRADEMARK OFFICE
CERTIFICATE OF CORRECTION

PATENT NO. : 5,411,135
DATED : May 2, 1995
INVENTOR(S) : Howard Danzyger et al.

It is certified that error appears in the above-indentified patent and that said Letters Patent is hereby corrected as shown below:

<u>On the Title Page</u>, in item [56] References Cited:

In column 2, in the section entitled "Other Publications", line 3, after "for" insert --the--;

In column 2, in the section entitled "Other Publications", line 4, after "for" insert --a--.

<u>In the Claims</u>, columns 11 and 12:

In claim 28, line 2, delete "from" and substitute --front--;

In claim 30, line 4, delete "wails" and substitute --walls--.

Signed and Sealed this

Fifth Day of December, 1995

Attest:

BRUCE LEHMAN

*Attesting Officer*  *Commissioner of Patents and Trademarks*